United States Patent
Shen

(10) Patent No.: US 10,345,544 B1
(45) Date of Patent: Jul. 9, 2019

(54) COMPOSITE OPTOELECTRONIC HDMI CABLE

(71) Applicant: SURE-FIRE ELECTRICAL CORPORATION, New Taipei (TW)

(72) Inventor: Chun-Lai Shen, New Taipei (TW)

(73) Assignee: Sure-Fire Electrical Corporation, New Taipei (TW)

( * ) Notice: Subject to any disclaimer, the term of this patent is extended or adjusted under 35 U.S.C. 154(b) by 0 days.

(21) Appl. No.: 15/977,228

(22) Filed: May 11, 2018

(51) Int. Cl.
| | |
|---|---|
| *G02B 6/44* | (2006.01) |
| *H01B 11/22* | (2006.01) |
| *H01B 7/295* | (2006.01) |
| *H01B 3/30* | (2006.01) |
| *H01B 7/18* | (2006.01) |

(52) U.S. Cl.
CPC .......... *G02B 6/4429* (2013.01); *G02B 6/443* (2013.01); *G02B 6/4436* (2013.01); *H01B 3/30* (2013.01); *H01B 7/182* (2013.01); *H01B 7/295* (2013.01); *H01B 11/22* (2013.01); *G02B 6/4482* (2013.01); *G02B 6/4486* (2013.01)

(58) Field of Classification Search
USPC ....................................... 174/70 R
See application file for complete search history.

(56) References Cited

U.S. PATENT DOCUMENTS

| | | | | |
|---|---|---|---|---|
| 3,766,307 A * | 10/1973 | Andrews, Jr. | ........ | G02B 6/4415 174/101.5 |
| 5,325,457 A * | 6/1994 | Bottoms, Jr. | ........ | G02B 6/4419 385/100 |
| 5,917,977 A * | 6/1999 | Barrett | ................. | G02B 6/4416 385/100 |
| 6,411,403 B1 * | 6/2002 | Siddhamalli | ........... | G02B 6/443 385/109 |
| 9,075,212 B2 * | 7/2015 | McAlpine | ............ | G02B 6/4413 |

* cited by examiner

*Primary Examiner* — William H. Mayo, III
*Assistant Examiner* — Krystal Robinson
(74) *Attorney, Agent, or Firm* — Rosenberg, Klein & Lee

(57) ABSTRACT

A composite optoelectronic HDMI cable having the advantages of low signal attenuation, long distance application, ease of installation and light weight is disclosed. Specifically, a fiber optic bundle unit is provided in the HDMI cable instead of the existing copper wire or alloy conductor, and the overall outer diameter is reduced by half and the weight is reduced by three quarters when compared to the copper wire or alloy conductor. It is very convenient for long-distance use or project laying.

9 Claims, 3 Drawing Sheets

COMPOSITE OPTOELECTRONIC HDMI CABLE

BACKGROUND OF THE INVENTION

1. Field of the Invention

The present invention relates to composite cable technology and more particularly, to a composite optoelectronic HDMI cable, which is practical for long distance application.

2. Description of the Related Art

With the development of technology, the popularity of 4K TV and improvement of people's life quality, the requirements for the transmission rate of high-frequency wire materials are getting higher and higher.

The High Definition Multimedia Interface (HDMI) wire material is a kind of wire suitable for high-frequency application. The common HDMI cable uses a metal wire as the transmission carrier. The disadvantage of the common HDMI cable is that the wire has a resistance, and the resistance will increase proportionally with the increase in length of the wire, resulting in signal attenuation. This disadvantage limits the bandwidth and the use of cable length. Currently on the market, HDMI common bandwidth is about 10.2 GBps, and the maximum applicable cable length is about 30 meters. The HDMI2.0 specification requires a transmission bandwidth of 18 GBps, and the longest transmission distance of the cable is 20 meters. HDMI increases transmission length and bandwidth by increasing the diameter of the copper conductor, but the ultimate transmission bandwidth of copper cables is 6 GBps and the transmission distance is about 20 meters. Therefore, for transmission distances of more than 30 meters, copper cables can no longer meet the requirements for the expected transmission distance and bandwidth.

Large screens for some large-scale audio and video display venues, high-end hotels, supermarkets and outdoor squares require some large-length HDMI cables, ranging from three to fifty meters in length and hundreds of meters in length. Due to the restriction of conventional HDMI cables as described above, conventional HDMI cables formed of copper wires cannot meet the requirements for wide bandwidth and long application length. It needs to be improved by those engaged in this industry.

SUMMARY OF THE INVENTION

The present invention has been accomplished under the circumstances in view. It is therefore the main object of the present invention to provide a composite optoelectronic HDMI cable, which has the advantages of low signal attenuation, long distance application, ease of installation and light weight. Specifically, a fiber optic bundle unit is provided in the HDMI cable instead of the existing copper wire or alloy conductor, and the overall outer diameter is reduced by half and the weight is reduced by three quarters when compared to the copper wire or alloy conductor. It is very convenient for long-distance use or project laying.

It is another object of the present invention to provide a composite optoelectronic HDMI cable, which has fillers mounted therein to increase the overall roundness of the cable and to improve the tensile and anti-swing strength of the cable and also to avoid damage to the internal properties of the cable during the cable laying process, and also has a shielding layer mounted around the center wire set to protect the overall structure of the center wire set against damage.

It is another object of the present invention to provide a composite optoelectronic HDMI cable, which has fillers mounted in between the fiber optic bundle unit and signal control lines thereof to increase the overall roundness of the cable and to improve the tensile and anti-bending strength of the cable, avoiding damage to the internal properties of the cable during the cable laying process.

It is still another object of the present invention to provide a composite optoelectronic HDMI cable, which has a flame-retardant jacket mounted around the center wire set and the shielding layer to protect the overall structure of the cable against damage, providing the advantages of wide application range, long use length, strong anti-aging property, and long service life.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
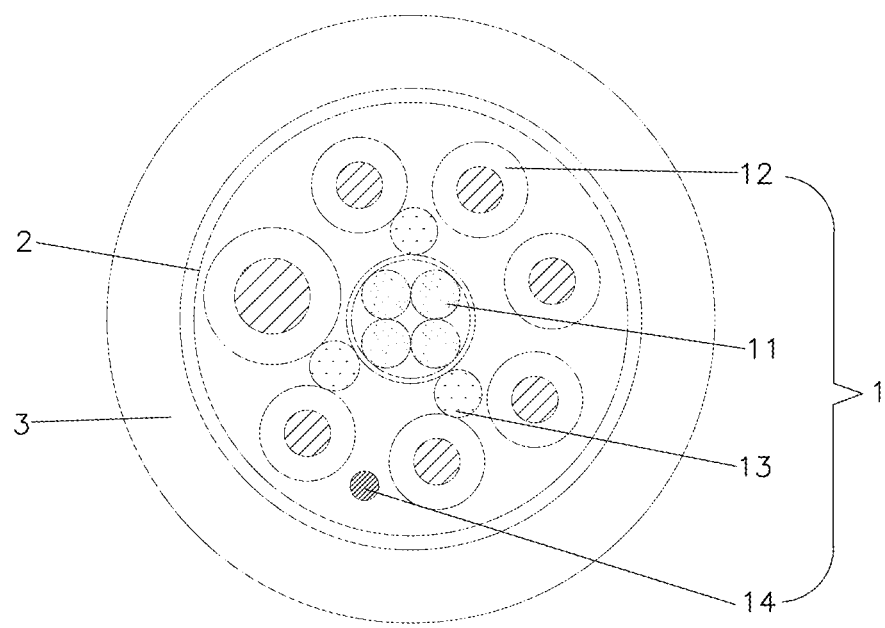
FIG. 1 is a cross-sectional view of a composite optoelectronic HDMI cable in accordance with the present invention.
Figure 2:
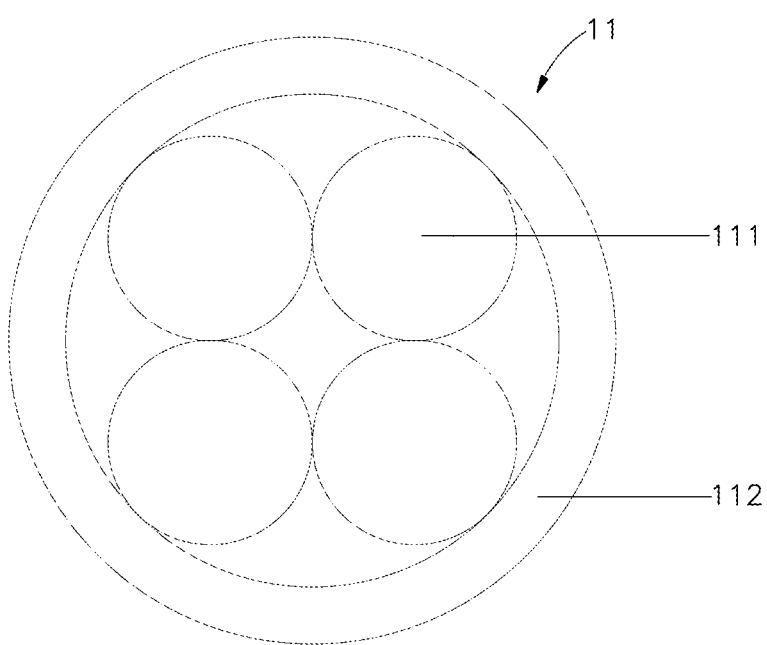
FIG. 2 is a cross-sectional view of the fiber optic bundle unit.

Referring to FIGS. 1 and 2, a composite optoelectronic HDMI cable in accordance with the present invention is shown. The composite optoelectronic HDMI cable comprises a center wire set 1, a shielding layer 2 and a flame-retardant jacket 3.

The center wire set 1 comprises a fiber optic bundle unit 11 containing a plurality of fiber cores 111 for transmitting optical signals, a plurality of signal control lines 12 arranged around the fiber optic bundle unit 11 for transmitting electronic signals, a plurality of fillers 13 mounted between the fiber optic bundle unit 11 and the signal control lines 12 to isolate the fiber optic bundle unit 11 and the signal control lines 12 and to increase their tensile and anti-bending strength, and a ground wire 14 mounted between two adjacent signal control lines 12 and used to provide electronic signals to ground.

The preferred color of the fiber cores 111 of the fiber optic bundle unit 11 is brown, green, blue or orange. In the present preferred embodiment, four fiber cores 111 are tightly arranged in a circle (that is, two rows and two columns). These fiber cores 111 are composed of OM3-300 fibers or OM4-550 fibers. Further, these fiber cores 111 are surrounded by a shrinking sheath 112. The shrinking sheath 112 is made of polyethylene, fire-retardant polyethylene, cross-linked polyethylene or polyfluorinated ethylene propylene. The inspection method for accurately controlling the wrapping tightness is to shrink the shrinking sheath 112 by 1%, and the additional attenuation of the optical fibers is less than 0.05 dB/km.

The invention uses the fiber bundle unit 11 to replace the existing copper conductor or alloy conductor for transmitting high-frequency signals. When the fiber cores 111 of the fiber bundle unit 11 uses OM3-300 multimode fibers, the transmission rate reaches 18 GBps and the transmission distance is up to 150 M. When the fiber cores 111 of the fiber bundle unit 11 uses OM4-550 multimode fibers, the transmission rate reaches 48 GBps and the transmission distance is up to 300 M.

The center conductor material of the signal control line 12 is composed of a single strand of tin-plated copper, bare copper, silver-plated copper, tin-plated copper, bare twisted copper, or silver-plated copper twisted copper. The outer insulative layer of the signal control line 12 is composed of polyethylene, foamed polyethylene, polyvinyl chloride, cross-linked polyethylene or polyfluorinated ethylene propylene.

The fillers 13 are made of aramid fiber, PP tear rope, cotton yarn or nylon yarn. The fillers 13 are filled in the gap between the fiber optic bundle unit 11 and the signal control lines 12, ensuring the roundness of the composite optoelectronic HDMI cable, and at the same time increasing the tensile and anti-bending strength of the composite optoelectronic HDMI cable and avoiding damage to the internal properties during cable laying process.

The fiber optic bundle unit 11 and the signal control lines 12 are stranded into a circular arrangement.

After the center wire set 1 is stranded subject to a fixed twist pitch and direction, the center wire set 1 is tightly wrapped by the shielding layer 2. The shielding layer 2 is composed of polyester tape, aluminum foil, copper foil Mylar tape, cotton paper or Teflon tape.

The flame-retardant jacket 3 surrounds the shielding layer 2 to protect the center wire set 1 and the shielding layer 2. The flame-retardant jacket 3 is made of polyvinyl chloride, low-smoke halogen-free flame-retardant polyolefin, nylon elastomer, thermoplastic elastomer, polyurethane elastomer or crosslinked polyethylene.

Figure 3:
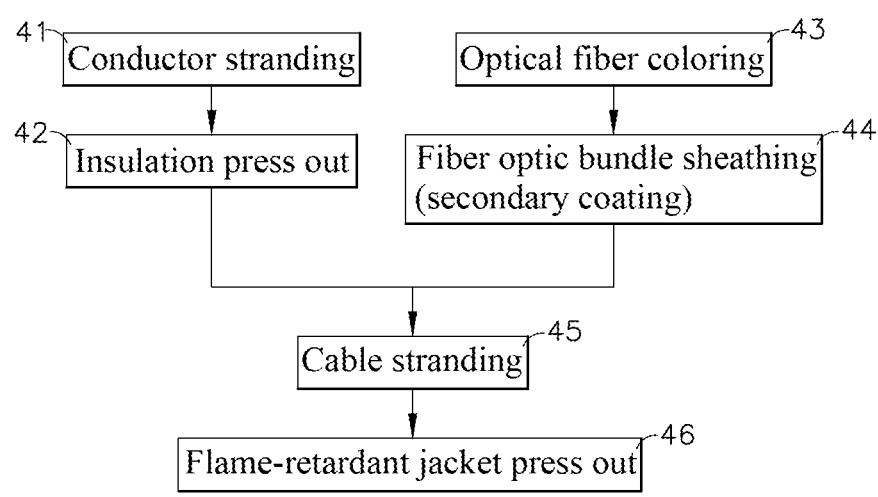
FIG. 3 is a flow chart illustrating the fabrication of the composite optoelectronic HDMI cable.

The invention also provides a method for making the composite optoelectronic HDMI cable. As illustrated in FIG. 3, the method comprises the steps of:

41. Conductor stranding: A plurality of single wires of the same diameter or different diameters are twisted into a strand subject to a predetermined twist direction and regulation. The conductor size is based on the customer's requirements. The specific single conductor material is tin-plated copper, bare copper, silver-plated copper or alloy wire. The twist direction is divided into left (S direction) and right (Z direction). If a single conductor is used, this conductor stranding process is not necessary.

42. Insulation press out: An insulating layer is extruded on the surface of each conductor using an extruder to form a signal control line. The specific implementation method is to select appropriate core (conductor) inner and outer molds according to the size of the copper wire and the extruded outer diameter and to set a series of parameters through a computer software for controlling the core wire diameter, extrusion temperature, capacitance and wire feeding speed. The core wire diameter tolerance is controlled within ±0.02 MM, the extrusion temperature tolerance is controlled within 2° C., and the capacitance tolerance is controlled within ±IPF. At the same time, in order to ensure good wire compatibility, low capacitance and stable wire quality, insulation materials with a relatively small dielectric constant are usually selected.

43. Optical fiber coloring: Curing ink is applied to the surface of the optical fiber via a coloring die to form a color optical fiber that is easy to identify. The specific method is to use a fiber shader for performing a fiber coloring process including the steps of optical fiber payoff, coloring die, ink supply system, ultraviolet curing oven, traction, optical fiber take-up and electrical characteristics control. The UV curing ink is coated on the surface of the optical fiber by the coloring die and then fixed on the surface of the optical fiber after being cured by the ultraviolet curing oven.

44. Fiber optic bundle sheathing (secondary coating): Use an extruder to extrude a layer of shrinking sheath over the outer surface of stranded bundle of colored optical fibers. Specifically, the optical fiber is discharged from the let-off reel with a certain tension. Under a reasonable process condition, the precision of the vacuum degree of the control head and the extrusion die are accurately matched to extrude a polymer plastic tube and shape-formed through independent temperature-controlled water tanks. The shape-formed polymer plastic tube is then pulled by a two-wheel surplus traction wheel to a take-up spool. The tension of the optical fiber, the extrusion temperature and the traction tension of the main traction wheel can control the tightness of the fiber optic bundle shrinking sheath. If the shrinking sheath is too loose, it is easy to shrink; if the shrinking sheath is too tight, the attenuation value of the optical fiber will be large. The testing standard of the specific optical fiber shrinking sheath is less than 1% after the shrinkage of the sleeve, and the additional attenuation of the optical fiber is less than 0.05 dB/km.

45. Cable stranding: The fiber optic bundle sheathing is stranded with a number of signal control lines in a certain arrangement and lay length. Specifically, the cable stranding process is an important process in the cable manufacturing process. The fiber optic bundle is placed in the center, several signal control lines are arranged around the fiber optic bundle, and a number of fillers (for example, aramid fibers) are added in the middle, and the fiber optic bundle, the fillers and the signal control lines are twisted in a predetermined direction by a reasonable lay length. Wrap a shielding layer about the signal control lines. The cable stranding process increases the flexibility and bendability of the cable and improves the tensile strength of the cable. At the same time, a cable with different core counts is manufactured through the combination of different signal control lines and different number of shrinking sheaths.

46. Flame-retardant jacket press out: Use a cable extrusion machine to extrude a layer of flame-retardant jacket outside the shielding layer for cable protection after the cable stranding process. Specifically, according to the size of the cable core after the cable stranding process, appropriate flame retardant sheath inner and outer dies are selected. Through the extrusion machine to control a series of parameters, such as extrusion temperature, extrusion volume and line feeding speed, a flame-retardant jacket of an appropriate outer diameter is pressed out. Different flame-retardant jacket materials are selectively used to wrap the cable core depending on the conditions of use of the cable. The flame-retardant jacket is a protective layer for the cable against various special and complex environments. It has excellent structural performance, environmental resistance, and chemical corrosion resistance. During the laying and use of the cable, the cable is subjected to various mechanical external forces such as tension, lateral pressure, impact, twisting, repeated bending, and the flame-retardant jacket can withstand the effects of these external forces.

With the disclosure of FIGS. 1-3, the composite optoelectronic HDMI cable of the present invention has the advantages of low signal attenuation, long distance application, ease of installation and light weight is disclosed. Specifically, a fiber optic bundle unit is provided in the HDMI cable instead of the existing copper wire or alloy conductor, and the overall outer diameter is reduced by half and the weight is reduced by three quarters when compared to the copper wire or alloy conductor. It is very convenient for long-distance use or project laying. The mounting of the fillers in the cable greatly increases the overall roundness of the cable and improves the tensile and anti-swing strength of the cable and avoids damage to the internal properties of the cable during the cable laying process. The arrangement of the shielding layer around the center wire set protects the overall structure of the center wire set against damage. Further, mounting the fillers in between the fiber optic bundle unit and signal control lines thereof can increase the overall roundness of the cable and improve the tensile and anti-bending strength of the cable, avoiding damage to the internal properties of the cable during the cable laying process. Further, the arrangement of the flame-retardant jacket around the center wire set and the shielding layer protects the overall structure of the cable against damage, providing the advantages of wide application range, long use length, strong anti-aging property, and long service life.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A composite optoelectronic HDMI cable, comprising:
   a center wire set, comprising:
   a fiber optic bundle unit containing a plurality of fiber cores for transmitting optical signals, said fiber cores being composed of OM3-300 fibers or OM4-550 fibers;
   a plurality of signal control lines arranged around said fiber optic bundle unit for transmitting electronic signals;
   a plurality of fillers arranged between said fiber optic bundle unit and said signal control lines to isolate said fiber optic bundle unit and said signal control lines and to increase the tensile and anti-bending strength of said fiber optic bundle unit and said signal control lines; and
   a ground wire mounted between two adjacent said signal control lines to provide electronic signals to ground;
   a shielding layer wrapped about said center wire set after said center wire set being stranded subject to a fixed twist pitch and direction; and
   a flame-retardant jacket surrounding said shielding layer center to protect said wire set and said shielding layer.

2. The composite optoelectronic HDMI cable as claimed in claim 1, wherein the preferred color of said fiber cores of said fiber optic bundle unit is brown, green, blue or orange.

3. The composite optoelectronic HDMI cable as claimed in claim 1, wherein said fiber optic bundle unit further comprises a shrinking sheath surrounding said fiber core, said shrinking sheath being selected from the group of polyethylene, fire-retardant polyethylene, cross-linked polyethylene and polyfluorinated ethylene propylene.

4. The composite optoelectronic HDMI cable as claimed in claim 1, wherein said signal control line comprises a center conductor material composed of a single strand of tin-plated copper, bare copper, silver-plated copper, tin-plated copper, bare twisted copper, or silver-plated copper twisted copper.

5. The composite optoelectronic HDMI cable as claimed in claim 1, wherein said signal control line comprises an outer insulative layer composed of polyethylene, foamed polyethylene, polyvinyl chloride, cross-linked polyethylene or polyfluorinated ethylene propylene.

6. The composite optoelectronic HDMI cable as claimed in claim 1, wherein said fillers are made of aramid fiber, PP tear rope, cotton yarn or nylon yarn.

7. The composite optoelectronic HDMI cable as claimed in claim 1, wherein said fiber optic bundle unit and said signal control lines are twisted into a circular arrangement.

8. The composite optoelectronic HDMI cable as claimed in claim 1, wherein said shielding layer is composed of polyester tape, aluminum foil, copper foil Mylar tape, cotton paper or Teflon tape.

9. The composite optoelectronic HDMI cable as claimed in claim 1, wherein said flame-retardant jacket is made of polyvinyl chloride, low-smoke halogen-free flame-retardant polyolefin, nylon elastomer, thermoplastic elastomer, polyurethane elastomer or crosslinked polyethylene.

* * * * *